Oct. 8, 1963  G. W. KITCHING  3,106,325
CABLE HAULING GEAR
Filed July 21, 1961  3 Sheets-Sheet 1
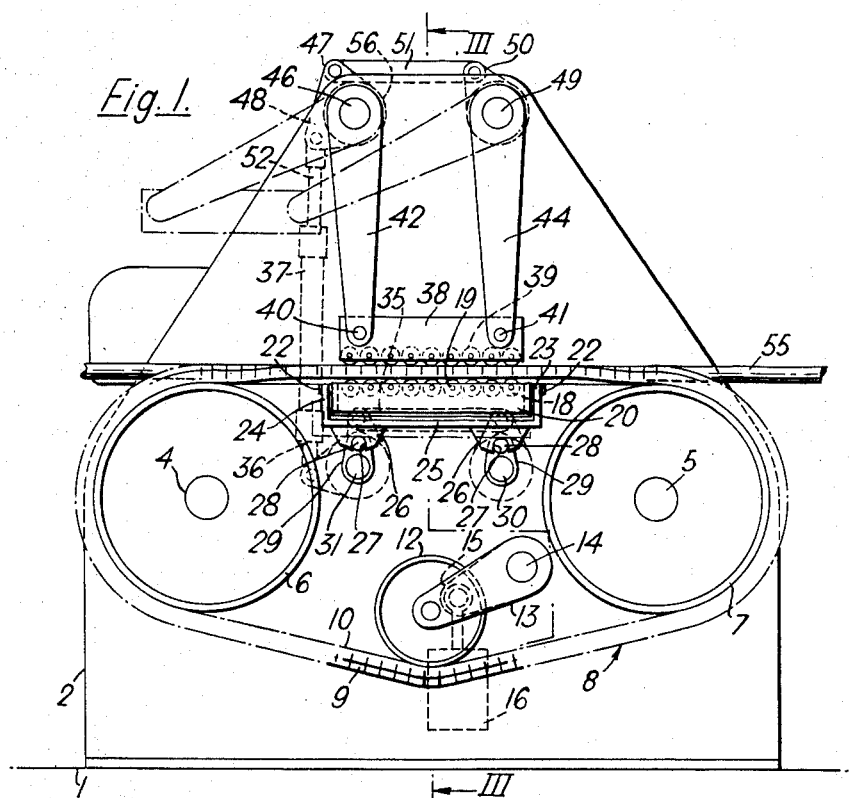
Inventor
Geoffrey W. Kitching
By Remson Palmer
Stewart & Easlebrook
Attorney Oct. 8, 1963

G. W. KITCHING 3,106,325

CABLE HAULING GEAR

Filed July 21, 1961

Inventor
Geoffrey W. Kitching
By Vernon Palmer
Stewart & Estabrook
Attorney

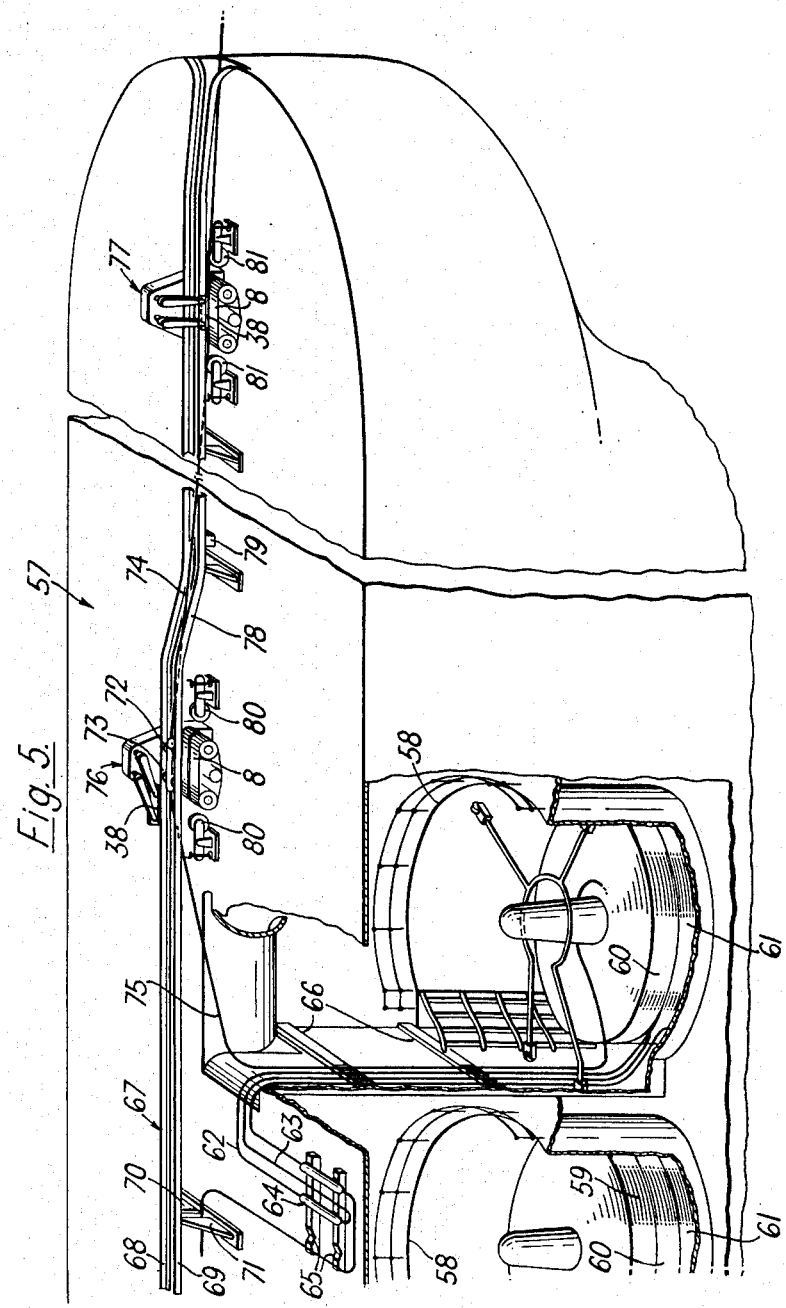

United States Patent Office 3,106,325
Patented Oct. 8, 1963

3,106,325
CABLE HAULING GEAR
Geoffrey Wallace Kitching, 259 Hainault Road,
Leytonstone, London E. 11, England
Filed July 21, 1961, Ser. No. 125,816
Claims priority, application Great Britain July 22, 1960
4 Claims. (Cl. 226—171)

This invention relates to cable hauling gear which may be used either for hauling cables on land or for laying submarine cables.

According to the present invention apparatus for hauling and paying out cables comprises an endless belt having two series of transverse flights positioned along opposite edges of a backing to form a substantially central channel along the outer surface of the belt for receiving the cable, and means for transversely distorting the belt along part of its path so that at least one edge of the belt is moved outwardly with respect to the channel portion of the belt to cause the cable to be gripped in the channel between the two sets of flights.

Movement of an edge outwardly with respect to the channel portion is of course the equivalent of movement of the channel member inwardly and the term is intended to include both possibilities.

With this apparatus the cable is laid in a straight line along the channel and so is hauled or payed out in a straight line and is not bent in any way. Also the force which is applied to the cable by the apparatus is acting along the full length of the cable which is gripped within the channel so that no heavy stresses are built up locally within the cable. For example it has been found that using some modern polythene insulated coaxial cable the maximum tension which can be applied to them might be 40 lbs. per inch of length gripped and if a greater tension is applied to polyethene will start to slip over the material which it covers. Thus if a total effective weight of cable of 8000 lbs. is hanging between a cable laying ship and the sea bed and the gripping pressure on the cable is limited so that it commences to slip when the pull on the cable exceeds 40 lbs. per inch length of cable gripped then the length of channel in which the cable is gripped must be 200 inches to hold the cable without slip. Thus by using a long enough belt any required weight of cable may be held without the load per unit length of cable gripped exceeding that load which would cause the polythene to slip over the material covered by it.

Preferably the means for transversely distorting the belt comprise means for holding the centre of the belt in a fixed plane and means for moving both edges of the belt outwardly from that plane. The means for holding the centre of the belt in a fixed plane is preferably a series of rollers each mounted on one of a series of parallel axles running in bearings in a housing which is movable toward or away from the belt. This series of rollers serves the dual function of holding the centre of the belt in a fixed plane and of holding the cable within the channel.

The means for raising the edges of the belt conveniently take the form of a set of rollers along each edge of the belt, and the rollers are carried on a platform which is movable towards and away from the underside of the belt, and extends across the width of the belt.

A particular form of apparatus according to the invention and its use in a cable laying vessel will now be described in more detail by way of example with reference to the accompanying drawings in which:

FIGURE 1 is a side elevation of an apparatus according to the invention;

FIGURE 2 is a perspective view from the other side and one end of the apparatus;

FIGURE 5 shows the way in which the apparatus is used on a cable laying ship.

Figure 3:
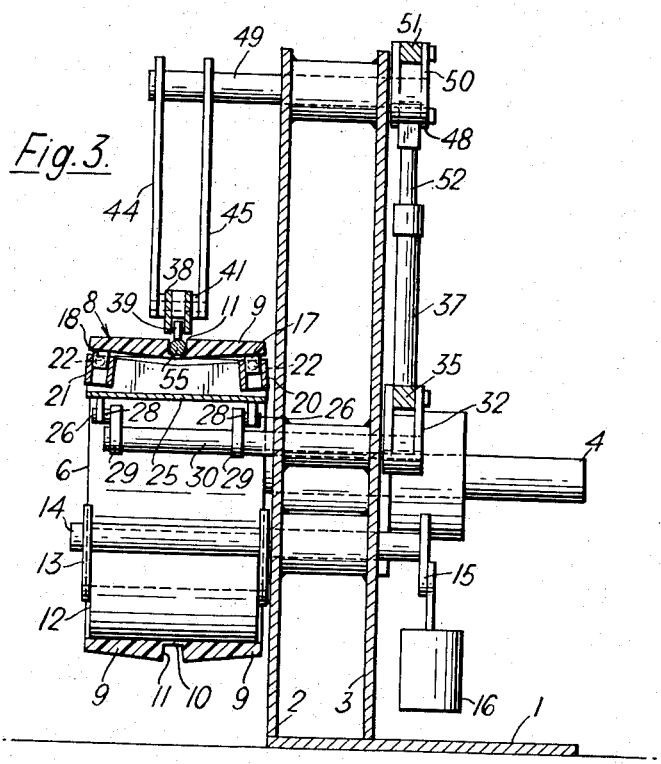
FIGURE 3 is a section on the line III—III of FIGURE 1.

The apparatus is mounted on a frame made up of a base plate 1 and two vertical side plates 2 and 3. Two shafts 4 and 5 are journalled in bearings in the side plates 2 and 3 and each carries a drum 6 and 7 respectively. Passing round the two drums 6 and 7 is an endless belt 8 which is made up as is shown most clearly in FIGURE 2 of two series of transverse flights 9 positioned along opposite edges of a backing 10 to form a central channel 11 along the length of the outer surface, that is the surface which is away from the rollers of the belt 8. The belt is made as a unitary moulding in a chloroprene sold under the registered trademark "neoprene." Alternatively the belt may be made up with a rubber backing and each flight may be a block of solid rubber cemented to the backing and having a steel rod moulded longitudinally in its centre to give it rigidity. In fact, the belt may be made in any way which will allow longitudinal distortion so that it can pass over two drums 6 and 7 and transverse distortion. In the embodiment illustrated the longitudinal distortion is, of course, made possible by the spaces between the individual flights.

The belt is kept taut by a jockey roller 12 which is mounted on the end of a lever 13 fixed to a shaft 14 free to turn in bearings in the side plates. One end of the shaft carries a further lever 15 from which is suspended a weight 16 providing further weight to maintain the required tension. Along the outer part of its path the two edges of the belt each pass over a set of rollers 17 and 18. Each roller of each set is mounted on an axle such as 19, the two sets of axles being journalled in two boxes 20 and 21. Each of the boxes has a pin 22 at each end and this pin is received in a groove formed in the end walls 23 and 24 of a platform 25. This mounting of the boxes allows them to rotate about an axis through the two pins and so ensures that the rollers 17 and 18 are at all times normal to the lower surface of the belt.

The base of the platform 25 carries four depending lugs 26 which are arranged two on each side of the platform. Each of the lugs has a groove 27 in its lower surface which fits over a pin 28 carried by an eccentric 29. The two eccentrics 29 at the same end of the platform are carried on shafts 30 and 31 respectively which pass through bearings carried in the side plates 2 and 3.

At the end which is opposite to the platform the shaft 30 carries a lever 32 while the shaft 31 carries a lever having two arms 33 and 34. The lever 32 and arm 33 are connected by a bar 35 which is pin jointed to each of the levers and acts to keep them parallel. The lever arm 34 is pin jointed to a lug 36 which is carried by a hydraulic cylinder 37.

Extending along the same length of the belt but on the other side of the belt to the platform 25 is a housing 38 carrying a number of jockey rollers 39 each mounted on an axis carried by the housing. As will be seen from FIGURE 3 the jockey rollers 39 are positioned directly above the channel 11. The housing 38 is pivotally mounted on two shafts 40 and 41 positioned one at each end of the housing. Each of these shafts is rigidly fixed between two arms the shaft 40 being carried by arms 42 and 43 and the shaft 41 by arms 44 and 45. Arms 42 and 43 are fixed to a shaft 46 which passes through bearings in the side plates 2 and 3 and carries at its other end a lever having two arms 47 and 48. The arms 44 and 45 are fixed to a shaft 49 which also passes through bearings in the side plates 2 and 3 and carries a lever 50 at its other end. A rod 51 is fastened by pin joints to the arm 47 and the lever 50 and acts to keep these arms parallel. A piston 52 which works in the cylinder 37 is pin jointed to arm 48. The piston and cylinder are operated by hydraulic pressure and the hydraulic fluid can be admitted to the cylinder either below or above the piston through pipes 53 and 54 respectively.

The belt is moved along its path by driving means which are not shown but which may be connected to either or both of the shafts 4 and 5. These driving means should be reversible so that the belt can be driven in either direction.

Figure 4:
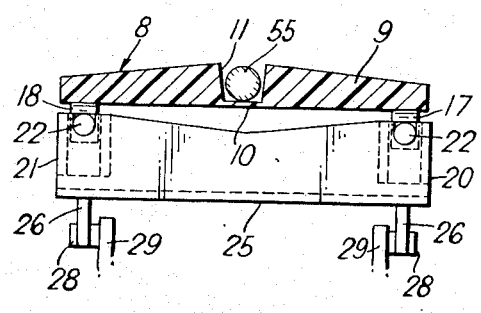
FIGURE 4 is a fragmentary view which corresponds to a part of FIGURE 3 and shows parts of the apparatus in a different position.

Before cable laying commences the belt is in the position shown in FIGURE 4 in which the backing is substantially flat and is supported at each edge by the rollers 17 and 18. In this position the channel 11 along the centre of the belt is open so that a cable 55 may be laid along it. When the belt is in this position the housing 38 and its associated arms are in the position shown in broken lines in FIGURE 1, that is, they are raised away from the outer surface of the belt. When the cable has been laid along the channel, hydraulic fluid is pumped into the cylinder through the pipe 54 so that the piston is forced downwardly into the cylinder. When this happens the two shafts 46 and 49 are turned in an anti-clockwise direction as shown in FIGURE 1 so that the housing 38 is lowered towards the belt. In the position shown in solid lines in FIGURE 1 and in FIGURE 3 the jockey wheels 39 are bearing lightly on the top of the cable 55. The jockey wheels are prevented from bearing too heavily on the cable by the bar 51 which as shown in the figures comes into contact with a part 56 of shaft 46 having a larger diameter than the remainder of the shaft, and this precludes the arm 48 from being pulled downwardly any further by the piston 52. The housing 38 and jockey wheels 39 are thus locked at the required height above the belt. When this stop mechanism has taken effect the cylinder 37 will start to move upwardly under the effect of the hydraulic fluid and this will rotate the shafts 30 and 31 in a clockwise direction as seen in FIGURE 1. This movement will raise the pins 28 which are carried on the eccentric portions of these shafts so that the platform 25 will be raised towards the belt. As this is raised the belt will be transversely distorted and the edges of the belt will move outwardly with respect to the centre of the belt in which the channel is formed which is held in a fixed plane by means of the jockey wheels 39. As the edges of the belt are raised the two edges of the channel 11 will be closed together and when the belt is in the position shown in FIGURE 3 they will be pressed against the opposite sides of the cable 55. Each belt is designed to take a particular size of cable and it will be seen from FIGURES 3 and 4 that the face of each flight is at such an angle to the backing that when a cable of the right diameter is being handled the forces applied to the cable by the two sides of the channel 11 are substantially across the width of the belt. The cable is thus gripped in the channel and is acted on by equal and opposite vertical forces from the jockey wheels 39 and the backing of the belt and equal and opposite horizontal forces from the two sets of flights. The pressure of the hydraulic fluid within the cylinder 37 is controlled so that the required force is applied to the cable, for instance, in the example quoted in the introduction the pressure is adjusted so that the cable is gripped with a pressure that will hold the cable without slip until the pull on the cable reaches a total of 40 lbs. per inch length of cable gripped by the belt at which point the cable would commence to slip in the channel of the belt. In practice the gripping length would be such that the maximum load on the cable would not exceed 40 lbs. per inch length of cable gripped and therefore slip would not occur.

Once the belt has been gripped in the channel in this way the motors for driving the shafts 4 and 5 are started in the required direction and the cable is thus hauled by means of the belt.

FIGURE 5 illustrates the specific use of two sets of hauling gear according to the invention for laying submarine cables. As is shown two identical sets of apparatus are positioned along the centre line of the cable laying ship 57 and one is positioned aft of the other. The ship illustrated is one which pays out cable over the stern of the ship but the apparatus could, of course, be used equally well with the type of vessel which pays out cable over the bow. The cable to be laid is stored in a number of tanks 58 which opens on to the deck so that the cable may be pulled out of the tank. As shown in the figure each tank carries originally three coils of cable 59, 60 and 61, each coil on top of the other. For submarine telephone cables it is necessary to include a repeater for boosting the electrical signals after each predetermined length of cable. The ship is loaded in such a way that this length of cable is contained in one of the coils and the end 62 of an upper coil such as 60 is connected to the beginning 63 of the coil below at 61, through such a repeater 64. All the repeaters 64 are stored on racked 65 fastened to the deck. The parts of the cable leading from the beginnings and ends of each coil to the repeaters are fastened in rows of clips such as 66 so that they pass vertically to the deck. The repeaters which are used are very heavy and cannot merely be dragged along the deck of the vessel by the cable which is being payed out. For this reason a track 67 is provided which runs from the storage tank nearest to the bow of the ship right to the stern of the ship. The track is formed of two L-shiped girders 68 and 69 each half of which is separately supported by a series of plates such as 70 and 71. This means that the central portion of the track is left open. Before the end of a coil of cable such as the end 62 is reached the associated repeater 64 is lifted from the rack and raised through the centre of the track 67, a small trolley being pushed under the repeater from the forward end of the track and the repeater rested on this trolley. The repeater 72 which is the one to be payed out previously to the one 64 is shown mounted on the trolley 73 and passing along the track. It will be seen that the repeater is being pulled along by the length of cable 74 preceding it and is pulling the beginning 75 of the coil 60 behind it. The progress of the cable is not hindered by the track since it lies along the open centre of the track for the whole of its journey.

Since the repeaters are rather bulky they will not fit in the channel of a belt which is designed for gripping the cable. Because of this it is necessary to use two sets of the apparatus according to the invention so that the cable is always gripped by one of them and is always in complete control. For instance as is shown in FIGURE 5 the repeater is seen passing over the belt 8 of the forward apparatus 76 the housing 38 associated with this apparatus being raised to above the level of the track 67 so that it will not foul the repeater as it passes through. The cable is being gripped in the channel of the belt 8 of the aft apparatus 77 the housing 38 of this apparatus being lowered so that the jockey wheels 39 are in contact with the cable and the cable is gripped in the channel as has already been described.

When a certain amount more of the cable has been payed out as is shown in the figure the repeater trolley will move down an inclined part 78 of the track and in doing so the part 75 of the cable pulling the repeater will fall into the open channel of the belt 8 of the apparatus 76. At the bottom of the incline there is provided a trip which the trolley operates and this changes the position of an electrical switch contained in a box 79 positioned beneath the track. This switch controls a hydraulic system and initiates the admittance of hydraulic fluid into the cylinder 37 of the apparatus 76 so that the jockey wheels are laid on to the top of the cable and the edges of the belt are raised to grip the cable in the channel. The motors for driving the apparatus 76 are at this time driving at the same speed as those driving the apparatus 77 so that for a short period the cable is being controlled by both of these belts. When it has passed a little further aft the trolley operates a further trip switch which controls the hydraulic circuit of apparatus 77 so that the edges of the belt are lowered and the jockey wheels are raised over the surface of the belt to the position in which the jockey wheels of the apparatus 76 are shown in the figure. The cable is thus being controlled by the apparatus 76 so allowing the repeater 72 to pass freely through the apparatus 77.

When starting to lay cable the apparatus must be driven to pull out cable from the tank. When at some stage off shore, there is so much cable hanging between the ship and the sea bed that its weight will tend to pull the cable from the ship then the drive to the apparatus 76 and 77 must be arranged so that it will hold the cable back by braking rather than drive it out.

For certain purposes it is necessary to have two different types of cable joined and laid in a continuous length for example, a normal polythene insulated cable, as already mentioned, may be joined to a length of armoured cable of a different dimension and a repeater being included at the join. The change of diameter of the cable means that the size of the channel in the belt 8 will not be correct so that the belt itself must be changed. To do this, before the repeater joining the two cables is lifted from its rack the apparatus is controlled so that the cable is being held back by apparatus 77. The pair of pulleys 80 associated with the apparatus 76 are raised above the level of the belt 8 so that the cable is supported above the belt and apparatus 76 is then stopped. This enables the belt to be removed from the drums and a new belt of the required size to be replaced. When the belt has been replaced apparatus 76 is started and operated at the same speed as apparatus 77 and pulleys 80 are covered. When the repeater has been lifted on to its trolley and has moved along the track through the apparatus 76 to the lower part of the track the following cable which is of the new diameter is gripped and controlled by the apparatus 76. After the repeater has passed through apparatus 77 the pulleys 81 associated with this apparatus are raised so that the following length of cable which is of the new diameter is raised above the level of the belt of this apparatus. The apparatus 77 is then stopped. This belt can then be changed in a similar manner to that of the preceding apparatus. It is obvious that apart from a change of diameter of the cable the pulleys associated with each belt can be used to raise the cable above that belt to allow routine maintenance of that apparatus.

It will thus be seen that the apparatus according to the invention permits a composite cable which may also include repeaters to be laid very easily and without possible damage since the cable is always held in a straight line.

I claim:

1. Apparatus for hauling and paying out cables comprising an endless belt having an inner surface and an outer surface, means engaging said inner surface to define a path of travel of said belt, means for driving said belt in either direction along said path of travel, two series of transverse flights on said outer surface of said belt, each series extending along said belt and two series being spaced apart to form a channel along said outer surface for receiving said cable, a platform positioned adjacent to said inner surface of said belt and extending across the width of said belt, supports extending along each side of said platform parallel to said path of travel of said belt and projecting from said platform towards said inner surface of said belt, a plurality of rollers associated with each support and running in bearings mounted on said supports, said rollers engaging said inner surface of said belt along the edges thereof, means for moving said platform towards and away from said inner surface of said belt, means for holding the center portion of said belt in a fixed plane so that as said platform is moved towards said inner surface of said belt said edges of said belt are moved outwardly while said center portion and thus said channel remains in said fixed plane so that said channel is narrowed for gripping said cable in said channel between said series of flights.

2. Apparatus according to claim 1, in which said supports take the form of boxes, and means are provided pivoting said boxes to said platform to rotate about an axis parallel to said path of travel of said belt so that said rollers are kept normal to said inner surface of said belt at their point of contact with said inner surface.

3. Apparatus for hauling and paying out cables comprising an endless belt having an inner surface and an outer surface, means engaging said inner surface to define a path of travel of said belt, means for driving said belt in either direction along said path of travel, two series of transverse flights on said outer surface of said belt, each series extending along said belt and the two series being spaced apart to form a channel along said outer surface for receiving said cable, a platform positioned adjacent to said inner surface of said belt and extending across the width of said belt, supports extending along each side of said platform parallel to said path of travel of said belt and projecting from said platform towards said inner surface of said belt, a plurality of rollers associated with each support and running in bearings mounted on said supports, said rollers engaging said inner surface of said belt along the edges thereof, a fluid pressure system for moving said platform towards and away from said inner surface of said belt, means positioned adjacent said outer surface of said belt for holding the center portion of said belt in a fixed plane, said last mentioned means including a series of rollers for engaging said cable when in said channel, a housing including mountings for said rollers, said mountings including bearings, moving means for moving said housing towards and away from said outer surface of said belt, said moving means being also controlled by said fluid pressure system, whereby when said fluid pressure system is operated to move said platform towards said inner surface of said belt and said housing towards said outer surface of said belt, said edges of said belt are moved outwardly while said center portion and thus said channel remains in said fixed plane so that said channel is narrowed for gripping said cable in said channel between said series of flights.

4. Apparatus according to claim 3, wherein said fluid pressure system includes two relatively movable members, movement of which is controlled by said fluid pressure, a first linkage between a first one of said members and said platform, a second linkage between a second one of said members and said housing, first stop means associated with said first linkage, second stop means associated with said second linkage so that as said members are moved relatively apart said housing is first moved towards said outer surface of said belt and stopped in a position in which said rollers hold said cable in said channel, and then said platform is moved towards said inner surface of said belt to move said edges of said belt outwardly relative to said central portion.

References Cited in the file of this patent

UNITED STATES PATENTS

| | | |
|---|---|---|
| 2,326,671 | Patterson | Aug. 10, 1943 |
| 2,642,280 | Fisk | June 16, 1953 |
| 2,709,000 | Frank et al. | May 24, 1955 |
| 2,967,008 | Johansson | Jan. 3, 1961 |
| 2,981,454 | Dickinson et al. | Apr. 25, 1961 |
| 3,019,855 | Engle | Feb. 6, 1962 |
| 3,032,247 | Lechner | May 1, 1962 |